US00RE34381E

United States Patent [19]

Barnes

[11] E Patent Number: Re. 34,381

[45] Reissued Date of Patent: Sep. 21, 1993

[54] AXIAL LOCKING DEVICE

[76] Inventor: Austen B. Barnes, 5040 Coronation Rd., R.R. 2 Whitby, Ontario, L1N 5R5, Canada

[21] Appl. No.: 444,605

[22] Filed: Nov. 30, 1989

Related U.S. Patent Documents

Reissue of:

[64] Patent No.: 4,709,454
Issued: Dec. 1, 1987
Appl. No.: 808,724
Filed: Dec. 13, 1985

[51] Int. Cl.[5] ..... A41F 1/00

[52] U.S. Cl. ..... 24/590; 24/597; 24/657; 403/322; 285/307

[58] Field of Search ..... 24/590, 591, 593, 595, 24/596, 597, 652, 656, 657; 292/252; 403/322, 325; 285/307, 315, 316

[56] References Cited

U.S. PATENT DOCUMENTS

| | | | |
|---|---|---|---|
| 1,045,891 | 12/1912 | Robertson | 292/252 |
| 2,291,975 | 8/1942 | Minero | 24/590 |
| 3,061,336 | 10/1962 | Waggener . | |
| 3,173,646 | 3/1965 | Wilcox . | |
| 3,345,710 | 10/1967 | Bush | 24/597 |
| 3,367,000 | 2/1968 | Schlater | 24/597 |
| 3,470,524 | 9/1969 | Culver | 24/597 |
| 3,540,091 | 11/1970 | Marosy | 24/597 |
| 3,675,499 | 7/1972 | Marosy | 24/597 |
| 3,822,951 | 7/1974 | Bornzin | 403/322 |
| 4,364,155 | 12/1982 | Synowicki | 24/597 |
| 4,531,802 | 7/1985 | Tomsa . | |
| 4,546,956 | 10/1985 | Moberg | 285/316 |
| 4,549,575 | 10/1985 | Rodgers | 285/316 |

FOREIGN PATENT DOCUMENTS

| | | | |
|---|---|---|---|
| 138388 | 5/1930 | China . | |
| 1425522 | 9/1969 | Fed. Rep. of Germany . | |
| 7637141 | 3/1977 | Fed. Rep. of Germany . | |
| 2106694 | 5/1972 | France | 285/307 |
| 540064 | 7/1977 | U.S.S.R. | 403/322 |
| 167783 | 7/1921 | United Kingdom | 24/597 |

*Primary Examiner*—Henry E. Raduazo
*Attorney, Agent, or Firm*—Remy J. VanOphem

[57] ABSTRACT

An axial locking device having two separable members which can be locked together and unlocked by relative axial movement of the two members in one direction. A slider is incorporated in one of the members and is movable relative to the member against a spring when the two members are moved axially relative to one another in one direction. The slider is displaced in one angular direction by interengagement of mutually engageable teeth on the one member and on the slider each time the slider is moved axially. This angular displacement of the slider locks the two members together when they are first pushed axially together against the force exerted by the spring on the slider and then unlocks the two members when they are subsequently pushed axially together against the spring force to permit one handed and/or speedy operation of the locking device.

15 Claims, 9 Drawing Sheets

AXIAL LOCKING DEVICE

Matter enclosed in heavy brackets [ ] appears in the original patent but forms no part of this reissue specification; matter printed in italics indicates the additions made by reissue.

BACKGROUND OF THE INVENTION

This invention relates to a releasable axial locking device.

SUMMARY OF THE INVENTION

It is an object of the invention to provide a releasable axial locking device which can resist tensile loads unrelated to the axial force required to operate the locking device.

According to the invention, there is provided a releasable axial locking device consisting of two separable members which can be locked together and unlocked by relative axial movement of the two members in one direction, a slider incorporated in one of the members and movable axially relative to one member against resilient means when the two members are moved axially relative to one another in one direction, and means for displacing the slider in an angular direction as it is moved axially against resilient means so that the angular displacement of the slider which occurs when the members are moved together in one direction results in the members being locked relative to one another and subsequent angular displacement of the slider which occurs when the two locked members are again moved relatively to one another in the one direction results in the members being unlocked and thereby axially separable in a direction opposite to the one direction.

Hence, with a locking device according to the invention, when the two members are pushed axially together against the force exerted by the resilient means on the slider, the members lock and resist tensile loads unrelated to the axial force required to operate the fastener. Moreover, the members can be unlocked to permit them to be pulled apart simply by again pushing the members together axially.

The axial movement to lock or unlock permits one handed and/or speedy operation.

Moreover, a through hole could be provided in the device rendering it suitable for use as a gas, fluid, electric or fiber optic connector.

The invention will now be more particularly described, by way of example, with reference to the accompanying drawings, in which:

DETAILED DESCRIPTION OF THE PREFERRED EMBODIMENT

Figure 1:
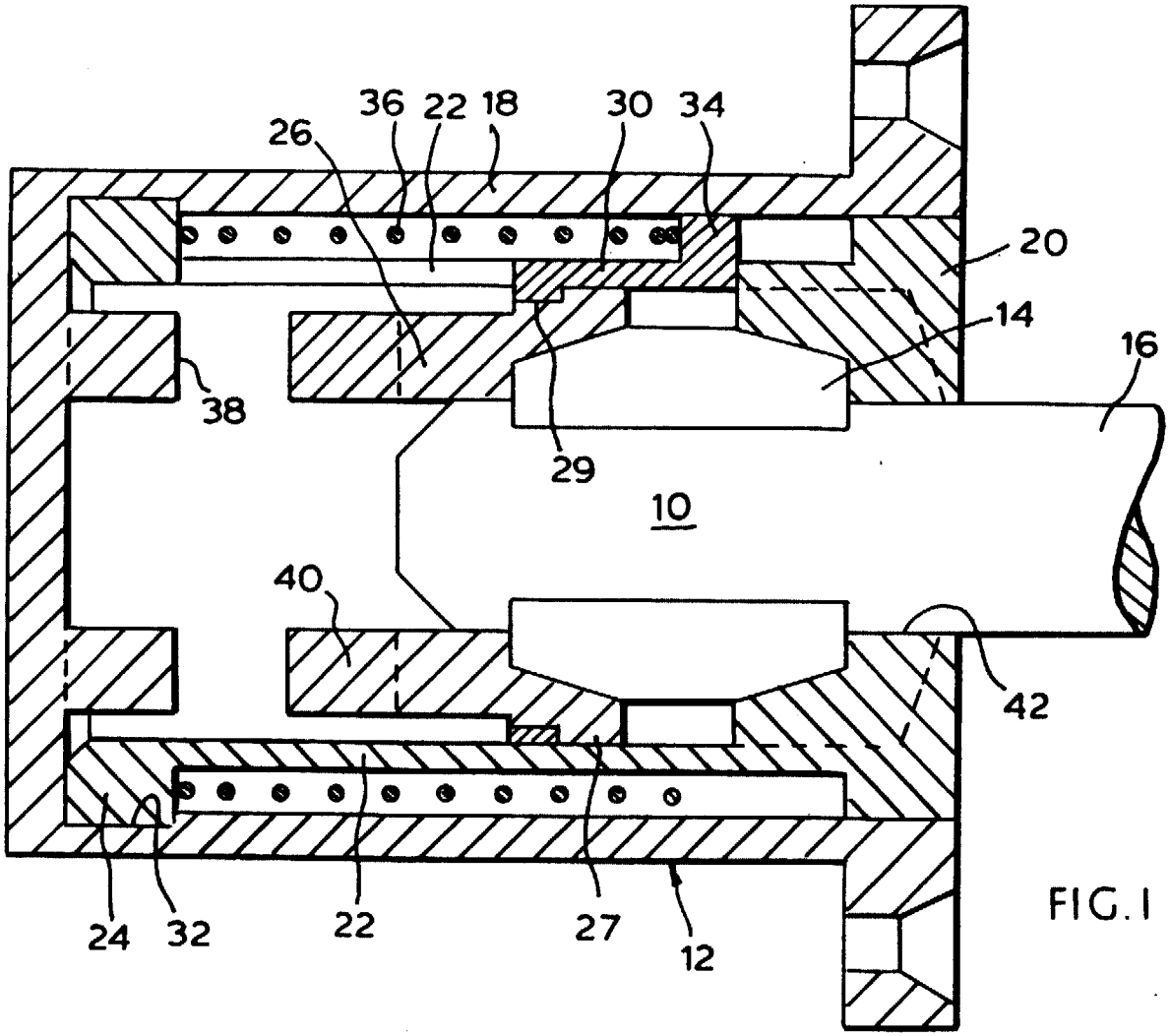
FIG. 1 is a longitudinal section through one embodiment of a device according to the invention, with the two members shown in a locked position.
Figure 2:
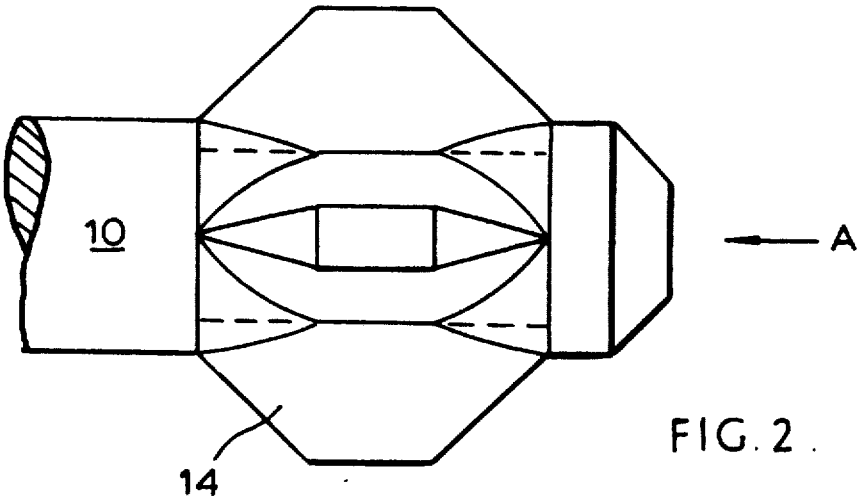
FIG. 2 is a side view of the male member of the device shown in FIG. 1.
Figure 3:
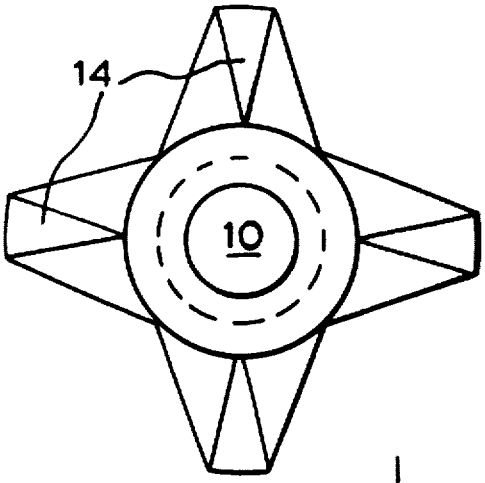
FIG. 3 is an end view of the male member of FIG. 2, taken in the direction of arrow A.

Referring firstly to FIGS. 1-8, the axial locking device shown therein includes male and female members 10 and 12, respectively, which can be locked together and unlocked by relative axial movement of the two members in one direction only. The male member 10 has a plurality of radially outwardly extending teeth 14 chamfered on the leading and trailing faces. As shown, there are four such teeth 14 which are equi-angularly spaced apart but there could be any number of teeth exceeding one. As shown, the toothed portion of the male member 10 is solid with an axial connecting shaft 16 but the toothed portion could be free to rotate relative to the connecting shaft 16 for reasons which will become apparent hereinafter.

The female member 12 consists of an outer cylindrical housing 18 closed at one end and open at the other, an entrance guide 20 having an integral axially inwardly extending spider 22 provided with radially outwardly extending feet 24 at the innermost end of the spider legs, and an annular slider 26 and associated spider 30. The radially outwardly extending feet 24 of the spider 22 engage as a snap-fit in an annular groove 32 in the base of the housing 18 to fix the entrance guide in the housing 18 at the open end thereof. The annular slider 26 is slidably mounted within the spider 22 integral with the entrance guide 20 and the legs of the spider 30 are interposed between the legs of the spider 22. The annular slider 26 is rotatable relative to its associated spider 30 and has an outwardly extending flange 27 engageable with an inwardly extending flange 29 of the spider 30 so that the spider 30 moves with the annular slider 26 when the latter is moved coaxially inwards in the housing and the annular slider moves with the spider 30 when the latter is urged in an opposite axial direction.

The free ends of the legs of the spider 30 have radially outwardly extending feet 34 and a compression spring 36 is interposed in the gap between the housing 18 and the spider 22 and extends axially between the radially outwardly extending feet 24 and the radially outwardly extending feet 34 to urge the annular slider 26 towards the entrance guide 20. This arrangement provides for a spring length which extends over a large part of the length of the housing 18, giving good fatigue life, with minimum percentage compression.

Figure 7:
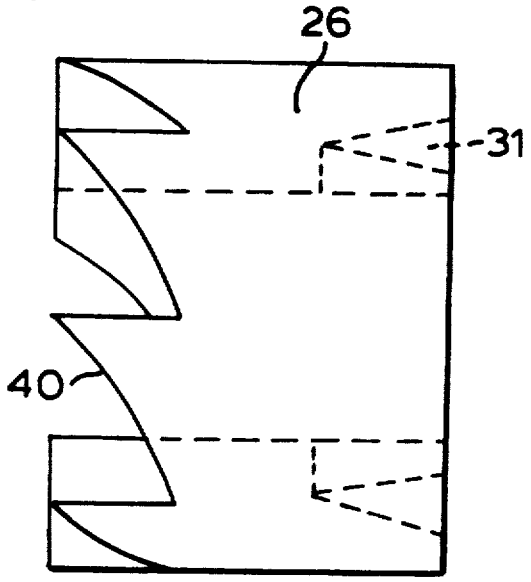
FIG. 7 is a side view of the slider of the device shown in FIG. 1.
Figure 8:
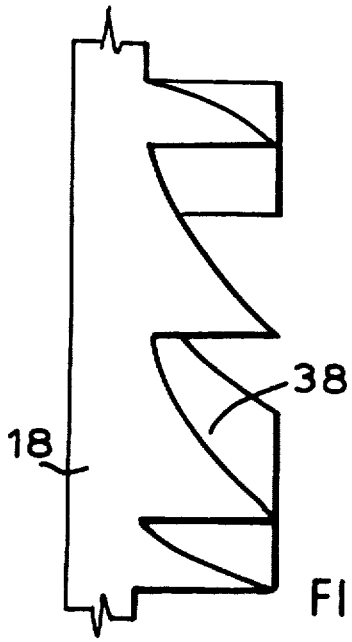
FIG. 8 is a partial side view showing the teeth at the innermost end of the female part of the device shown in FIG. 1.

As best shown in FIGS. 7 and 8, the closed end of the housing 18 and the innermost axial end of the annular slider 26 each have eight circumferentially spaced mutually engageable sawtooth teeth 38 and 40, respectively.

Figure 4:
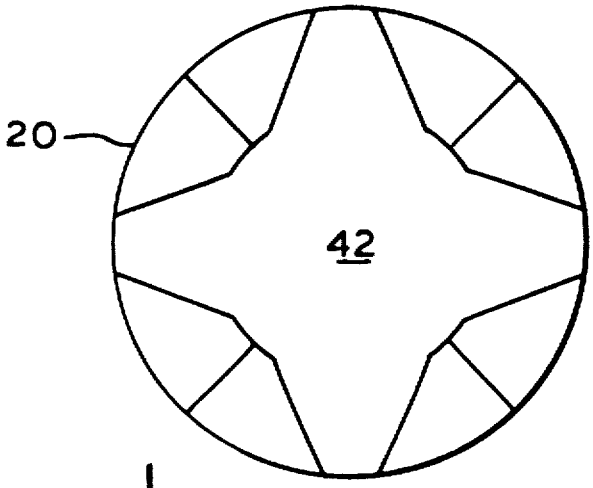
FIG. 4 is an outer end view of the entrance guide to the female member of the device shown in FIG. 1.
Figure 5:
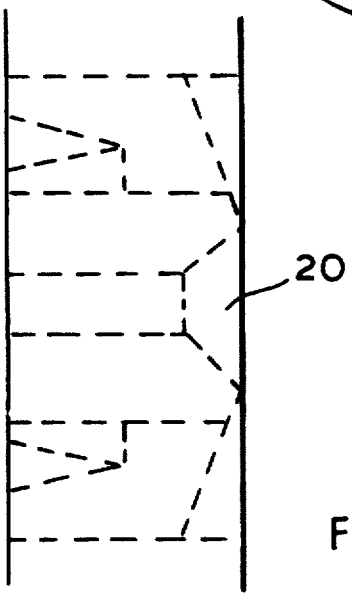
FIG. 5 is a partial side view of the entrance guide of FIG. 4.

As best seen in FIGS. 4 and 5, the entrance guide 20 has therein a star-shaped opening 42 which is profiled to permit passage therethrough of the toothed portion of the male member 10. The entrance face, i.e. the outermost face, of the entrance guide has a chamfered and blended profile (as best seen in FIG. 4) which facilitates easy alignment of the male member with the star-shaped 42. The guide 20, therefore, guides the male member opening 10 into the housing 18 in such a manner that the tooth phasing of the male member is predetermined relative to the housing.

As best seen in FIG. 7, the outermost end face of the annular slider 26 is recessed as shown at reference character 31 to receive and seat the inner ends of the radially outwardly extending teeth 14 of the male member 10. The radially outwardly extending teeth 14 of the male member 10 engage the recessed face of the annular slider 26 while its rotational orientation is still set by the entrance guide 20 to ensure desired angular alignment of the annular slider 26.

Figure 6:
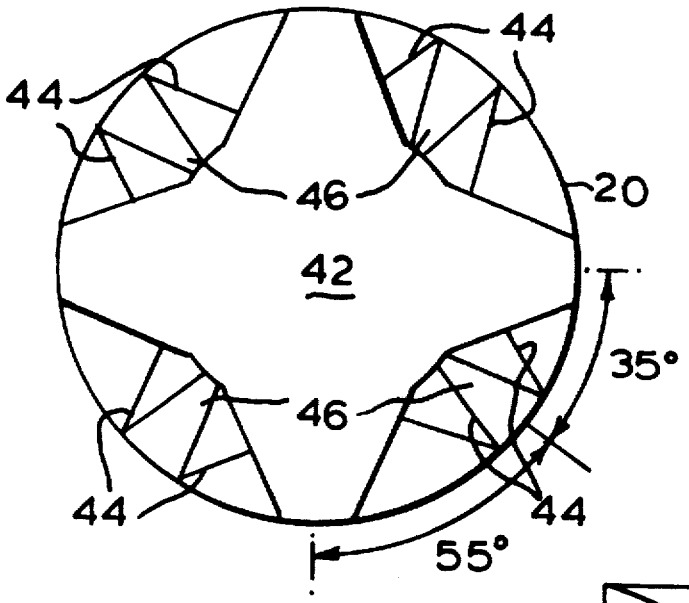
FIG. 6 is an inner end view of the entrance guide of FIGS. 4 and 5.

As best seen in FIG. 6, the inner end face of the entrance guide 20 is provided with four pairs of teeth 44 which define chamfered recesses 46 for receiving the trailing end faces of the radially outwardly extending teeth 14 of the male member in a manner which will be described later. It is however important to note that the bottoms of the recesses are not located at exactly 45° to imaginary planes bisecting adjacent openings in the entrance guide 20 through which pass the radially outwardly extending teeth 14 of the male member but are asymmetrically arranged for a reason which will become apparent.

In order to fasten the male and female members 10 and 12 together the male and female members are moved relatively together in an axial direction until the radially outwardly extending teeth 14 on the male member 10 engage the chamfered outer face of the entrance guide 20. The chamfered face as aforesaid permits easy alignment of the teeth 14 of the male member 10 with the star-shaped opening 42 in the entrance guide 20. The male member 10 then passes through the star-shaped opening 42 and the radially outwardly extending teeth 14 of the male member nest or seat firmly in the recessed face of the annular slider 26. Further relative axial movement of the male and female members moves the annular slider 26 axially against the force of the spring 36 until the sawtooth teeth 40 on the annular slider engage the sawtooth teeth 38 on the housing 18 whereupon the annular slider 26 and hence the male member 10 are displaced angularly by one half of the tooth pitch of the male member 10. Whether or not the shaft 16 rotates as well will depend on whether it is solid with the toothed portion of the male member 10 or free to rotate relative thereto.

When an attempt is then made to move the male and female members apart axially, the radially outwardly extending teeth 14 on the male member will contact the inner end face of the entrance guide 20 since the radially outwardly extending teeth 14 will have been rotated out of radial alignment with the star-shaped opening 42.

In practice the radially outwardly extending teeth 14 of the male member will nest in the chamfered recesses 46 defined by the teeth 44 of the inner end face of the entrance guide 20. These chamfered recesses 46 serve two purposes. Firstly, they provide seats for the teeth of the male member, preventing accidental operation of the device by vibration or shock. Secondly, as the radially outwardly extending teeth 14 settle into place in the recesses 46 of the asymmetrical arrangement of these recesses 46 relative to the star-shaped opening 42 is such as to cause the radially outwardly extending teeth 14 to rotate very slightly in the same angular direction as the rotation caused by the interaction between the circumferentially spaced teeth 38 on the housing 18 and the circumferentially spaced mutually engaging teeth 40 on the slider and as the annular slider 26 is held in engagement with the radially outwardly extending teeth 14 of the male member by the compression spring 36 the slider will also rotate slightly. This is important for a reason which will become apparent from the discussion hereinafter.

In order to unlock and part the male and female members, the male and female members are once again moved relative to one another in an axial direction in a sense which moves the circumferentially spaced mutually engaging teeth 40 of the annular slider 26 once again into engagement with the circumferentially annular spaced teeth 38 on the housing against the force of the compression spring 36. Because the annular slider 26 has been rotated slightly by the interaction of the radially outwardly extending teeth 14 with the chamfered recesses 46 from its position when it previously engaged the circumferentially spaced housing teeth 38, the circumferentially spaced mutually engaging teeth 40 on the annular slider will each engage the next tooth to the previous engagement on the housing and the annular slider 26 and hence the male member 10 will be rotated by another half pitch of the male member's radially outwardly extending teeth 14. It will be seen that the overall result is that the male member 10 has now been rotated by a full tooth pitch since it entered the housing 18 of the female member 12 and, consequently, can now be readily withdrawn through the star-shaped opening 42 in the entrance guide 20.

As shown in FIG. 1, the circumferentially spaced housing teeth 38 are integral with the housing 18 but instead they could be provided on a disc snap-fittable or otherwise securable to the closed end of the housing 18.

Figure 9:
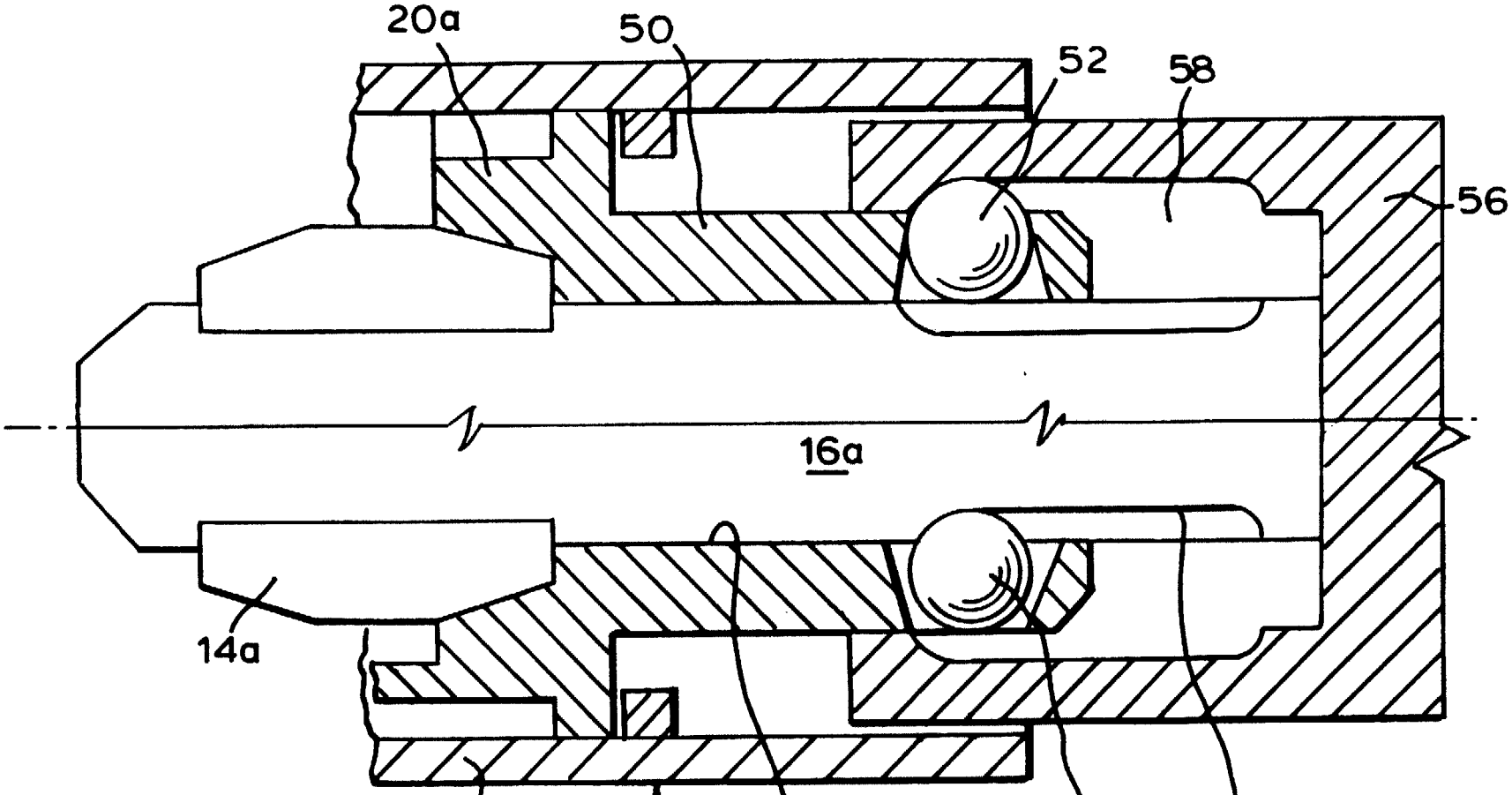
FIGS. 9 and 10 are fragmentary longitudinal sectional views of two further embodiments of a device according to the invention.
Figure 11:
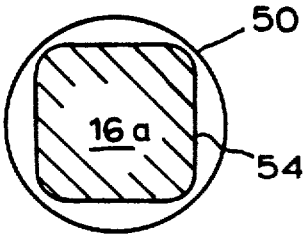
FIGS. 11 and 12 show the cam configurations of the devices shown in FIGS. 9 and 10, respectively.

Referring now to FIGS. 9 and 11, the embodiment shown therein differs from that shown in FIGS. 1–8 in the following respects. The male member 10a includes the housing 18a; the teeth 14a are not removable from the housing 18a. The housing 18a is extended. The entrance guide 20a has a tubular extension 50 and only a plain cylindrical opening 42a; it also has a plurality, e.g. four, of radially extending outwardly tapered holes in its tubular extension 50 which each hold captive a locking element in the form of a locking ball 52. The shaft 16a bearing the teeth 14a has a circumferentially extending cam surface 54, as best seen in FIG. 11, and the female member in this embodiment is in the form of a cup-shaped member 56 which is provided with an inner annular circumferentially extending groove 58 and which is separable from the housing 18a.

Initially with the male and female members 10a and 56, respectively, parted the circumferentially extending cam surface 54 is angularly orientated as shown in the lower half of FIG. 9 so that the open end of the cup-shaped female member 56 can pass over the locking balls 52 in one axial direction to such an extent that the locking balls 52 become transversely aligned with the annular circumferentially extending groove 58 by the time that the free end of the shaft 16a makes contact with the inner end of the female member 56. Further relative axial movement in one direction of the female member will result in movement of the shaft 16a and hence of the slider (not shown) towards the inner end of the housing 18a. The sawtooth teeth on the slider and the sawtooth teeth on the housing 18a will interact in exactly the same manner as described in connection with the previous embodiment to cause angular displacement of the slider and of the shaft 16a by one eighth of a revolution. This will result in the circumferentially extending cam surface 54 urging the locking balls 52 into the annular circumferentially extending groove 58 as shown in the upper half of FIG. 9. With the cam surface orientated in this manner the locking balls 52 will prevent separation of the male and female parts 10a and 56, respectively.

In order to unlock the male and female members so as to permit separation thereof the cup-shaped female member 56 is again moved axially relative to the male member in one direction. The slider and hence the shaft 16a and circumferentially extending cam surface 54 will rotate further in the same direction so that the cam surface is now displaced by one quarter of a revolution from its original starting position to allow the open end of the cup-shaped female member 56 to pass over the locking balls 52 to be withdrawn.

Figure 10:
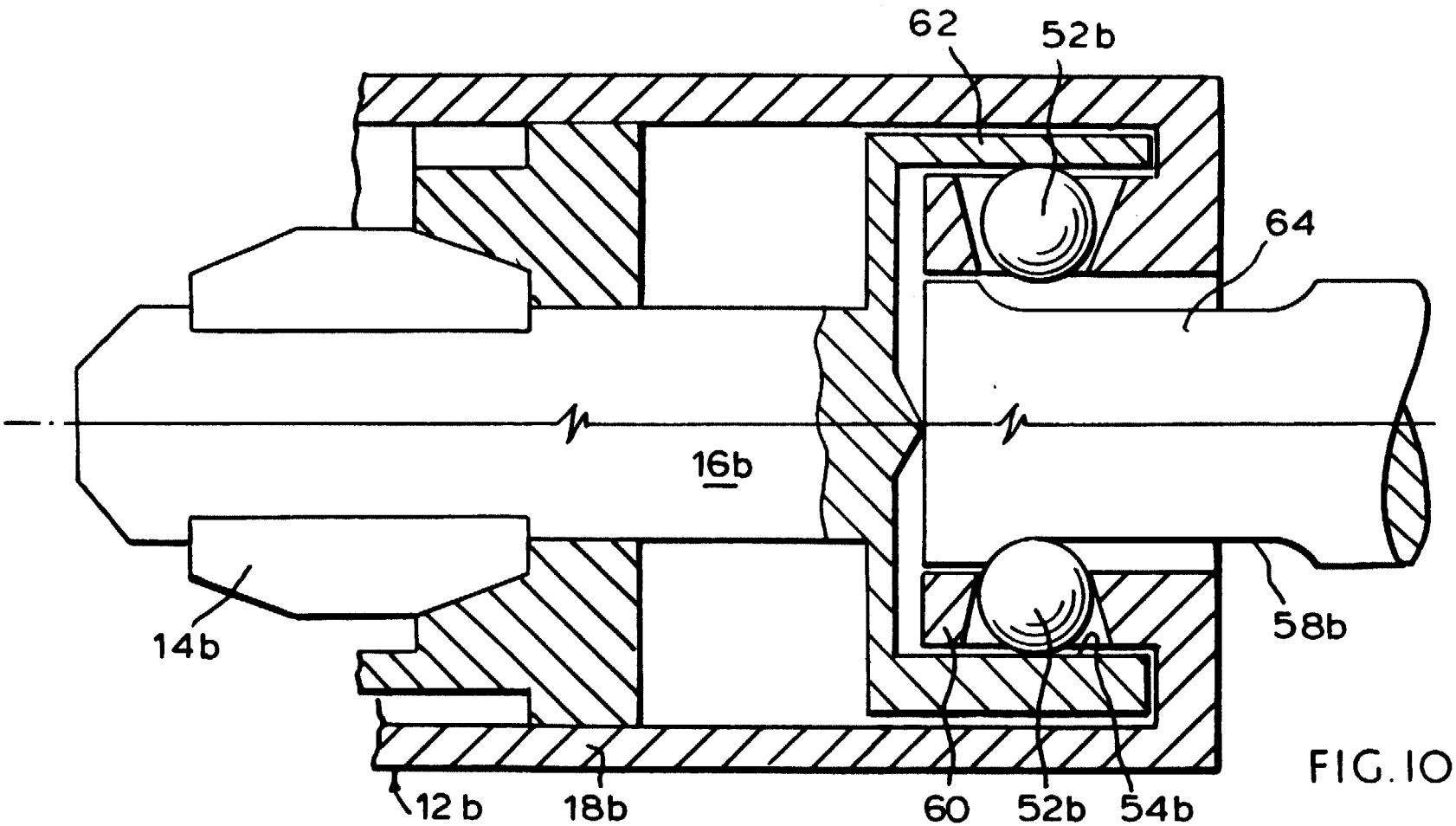
Figure 12:
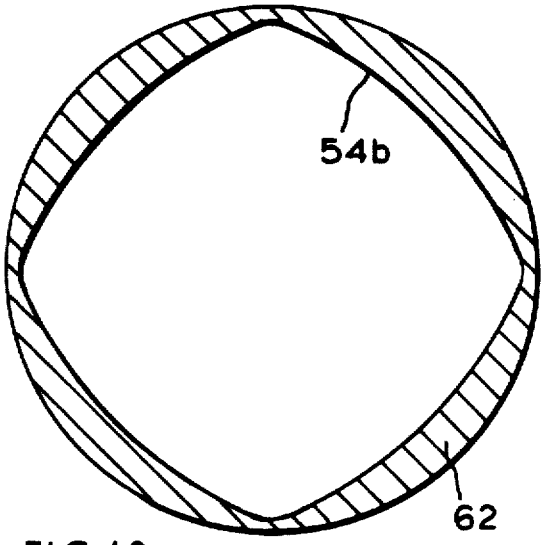

Referring now to FIGS. 10 and 12, the embodiment shown therein differs from that shown in FIGS. 9 and 11 in the following respects. The housing 18b and shaft 16b now form part of the female member 12b. The locking balls 52b are held captive in tapered holes in an annular re-entrant flange 60 of the housing 18b. The cam surface 54b as best seen in FIG. 12 is provided by a cup-shaped portion 62 at the free end of the shaft 16b and is axially slidable in a gap defined between the housing 18b and its re-entrant flange 60 to, in this embodiment, urge the locking balls 52b radially inwards, and the male member is in the form of a stud-shaped member 64 provided with an annular circumferentially extending groove 58b in its peripheral surface.

This embodiment operates in a similar manner to the embodiment shown in FIGS. 9 and 11 and described above. To lock the male and female members together the male member 64 is moved axially into the re-entrant flange 60 of the housing 18b of the female member and over the locking balls 52b until it comes into contact with the base of the cup-shaped portion 62 at the free end of the shaft 16b. Further axial movement of the male member 64 moves the shaft 16b and slider (not shown) towards the closed end of the housing 18b. Interaction between the sawtooth teeth of the slider and of the housing 18b displaces the slider, the shaft 16b and hence the cam surface 54b angularly to urge the locking balls 52b outwardly and into the annular circumferentially extending groove 58b and lock the male and female members together. The male and female members can be unlocked by again moving them axially relative to one another.

Figure 13:
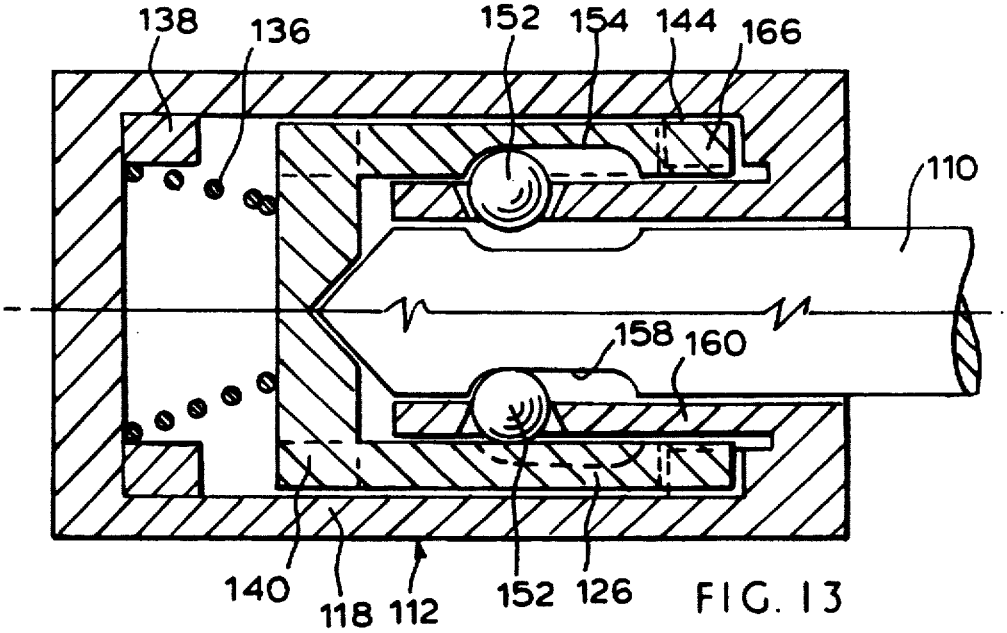
FIG. 13 is a longitudinal sectional view of another embodiment of a device according to the invention.

The embodiment shown in FIG. 13 is a simplified constructional arrangement of the embodiment shown in FIGS. 10 and 12 and consists of a stud-like male member 10 and 12 and consists of a stud-like male member 110, a female member 112 having a housing 118 closed at one end and open at the other, and a cup-shaped slider 126.

The housing 118 has a re-entrant flange 160 at its open end and this re-entrant flange has four equi-angularly spaced radially extending and inwardly tapered holes which each hole captive a locking ball 152. The housing also has sawtooth teeth 138 and 144 at its closed end and at its open end in the gap between its outer wall and its re-entrant flange 160, respectively. The sawtooth teeth 138 and 144 are respectively engageable with sawtooth teeth 140 on the base of the cup-shaped slider 126 and sawtooth teeth 166 at the open end of the cup-shaped slider 126.

The slider 126 is slidable in the housing 118 and extends into the aforesaid gap between the outer wall and the re-entrant flange 160 of the housing 118, the slider 126 being urged towards the open end of the housing 118 by a dished compression spring 136.

The slider 126 has an inner circumferentially extending cam surface 154 and the stud-like male member 110 has an annular circumferentially extending groove 158.

Figure 14:
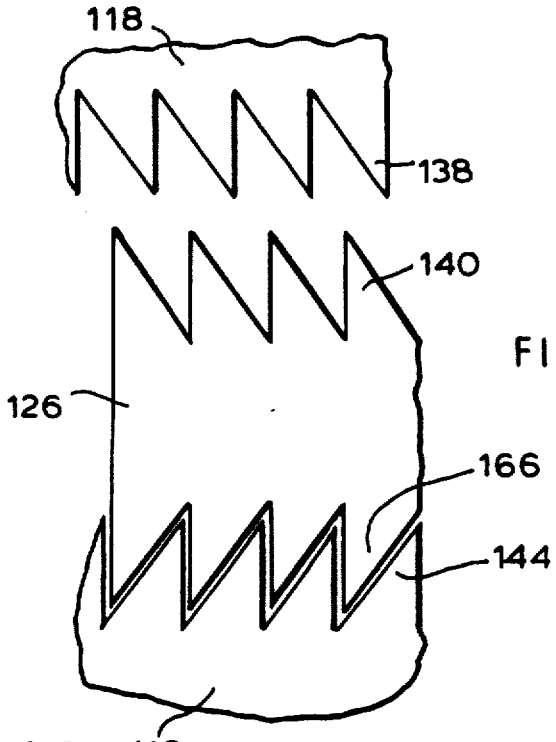
FIG. 14 is a schematic developed view showing the arrangement of teeth in the device of FIG. 13.

When the male and female members are parted the slider 126 is angularly orientated with its cam surface 154 as shown in the supper half of FIG. 13. In order to lock the male and female members together the male member 110 is moved axially through the re-entrant flange 160 of the housing 118 and because of the aforesaid said angular orientation of the inner circumferentially extending cam surface 154 the male member 110 can pass over the locking balls 152 and its pointed end can engage in a correspondingly shaped recess in the base of the cup-shaped slider 126. Further axial movement of the male member 110 results in axial movement of the slider 126 against the force of the spring 136. When the sawtooth teeth 140 of the slider 126 engage with the sawtooth teeth 138 of the housing 118 the slider is angularly displaced. This results in angular displacement of the cam surface 154 to urge the locking balls 152 into the annularly circumferentially extending groove 158 in the male member 110. When an attempt is made to withdraw the male member 110 the inner end of the annularly circumferentially extending groove 158 moves into engagement with the locking balls 152 to lock the male and female members together. The cup-shaped slider 126 moves towards the open end of the housing 118 under the action of the spring 136 and the sawtooth teeth 166 at the open end of the cup-shaped slider 126 engage with the sawtooth teeth 144 in the housing 118. As best seen from the schematic view of FIG. 14, the sawtooth teeth 138 and 144 are angularly offset from one another such that when the sawtooth sawtooth teeth 166 engage the teeth 144 the slider is further displaced angularly in the same direction but not so that the inner circumferentially extending cam surface 154 releases the locking balls 152 from engagement with the annularly circumferentially extending groove 158 of the male member. This offset arrangement of the sawtooth teeth 138 and 144 does, however, ensure that when the slider sawtooth teeth 140 next engage the housing sawtooth teeth 138 on a subsequent inward axial movement of the stud-like male member 110, the slider is further displaced angularly in the same direction so that the inner circumferentially extending cam surface 154 now allows the locking balls 152 to disengage from the annularly circumferentially extending groove 158 to permit the male and female members to be separated.

Figure 15:
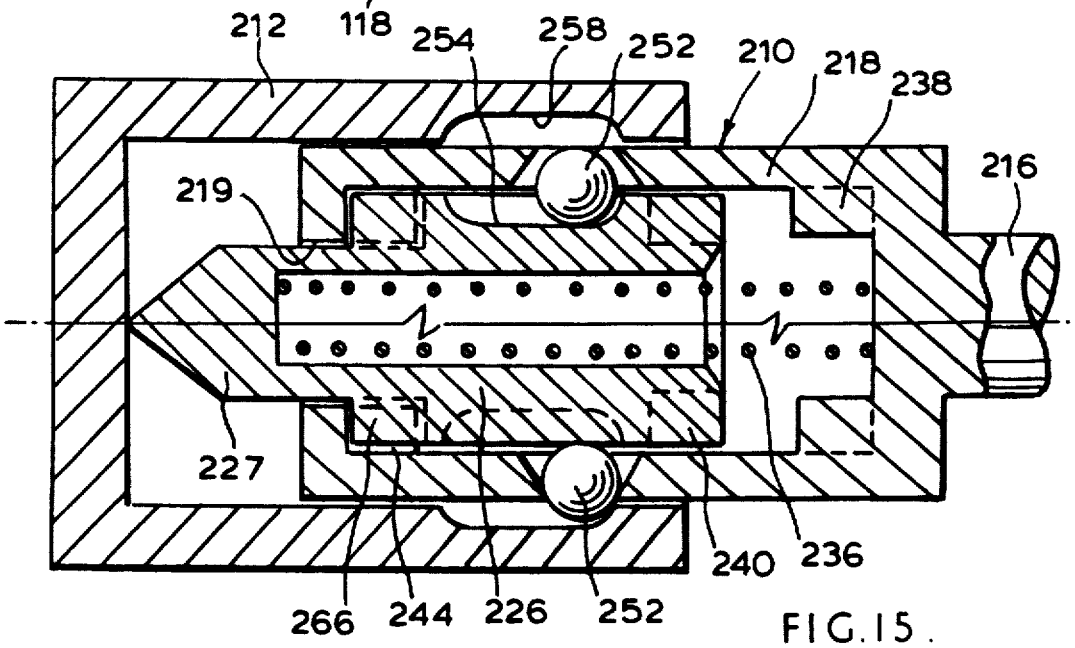
FIGS. 15 and 16 are longitudinal sectional views of yet further embodiments of a device according to the invention.

The embodiment shown in FIG. 15 has a male member 210 having a housing 218 attached to a shaft 216 and accommodating a slider 226, and a cup-shaped female member 212. The housing 218 has an opening 219 at one end through which a projecting portion 227 of the slider 226 extends under the action of a compression spring 236. The housing 218 has at opposite ends sawtooth teeth 238 and 244, respectively, which are engageable with sawtooth teeth 240 and 266, respectively, on the slider 226. The sawtooth teeth 238 and 244 are angularly offset in similar manner to the sawtooth teeth 138 and 144 of FIG. 14. The slider 226 has a cam surface 254 which acts on the locking balls 252 held captive in radially extending outwardly tapered holes in the housing 218 and the female member 212 has an inner annular circumferentially extending groove 258.

When the male and female members are moved together axially, the free end of the female member 212 passes over the locking balls 252 and the base of the female member engages the projecting portion 227 of the slider 226. The slider sawtooth teeth 240 are driven into engagement with the sawtooth teeth 238 in the housing 218 and the slider 226 is displaced angularly so that cam surface 254 urges the balls 252 into the inner annular circumferentially extending groove 258 (as shown in the lower half of FIG. 15) to lock the male and female members together. The sawtooth teeth 244 and 266 cooperate as described in the previous embodiment to displace the slider 226 further in the same angular direction so that when the male and female members are again pushed together the sawtooth teeth 238 and 240 again cooperate to displace the slider yet further in the same angular direction so that the cam surface allows the locking balls 252 to disengage from the groove 258 to permit the male and female members to be separated.

Figure 16:
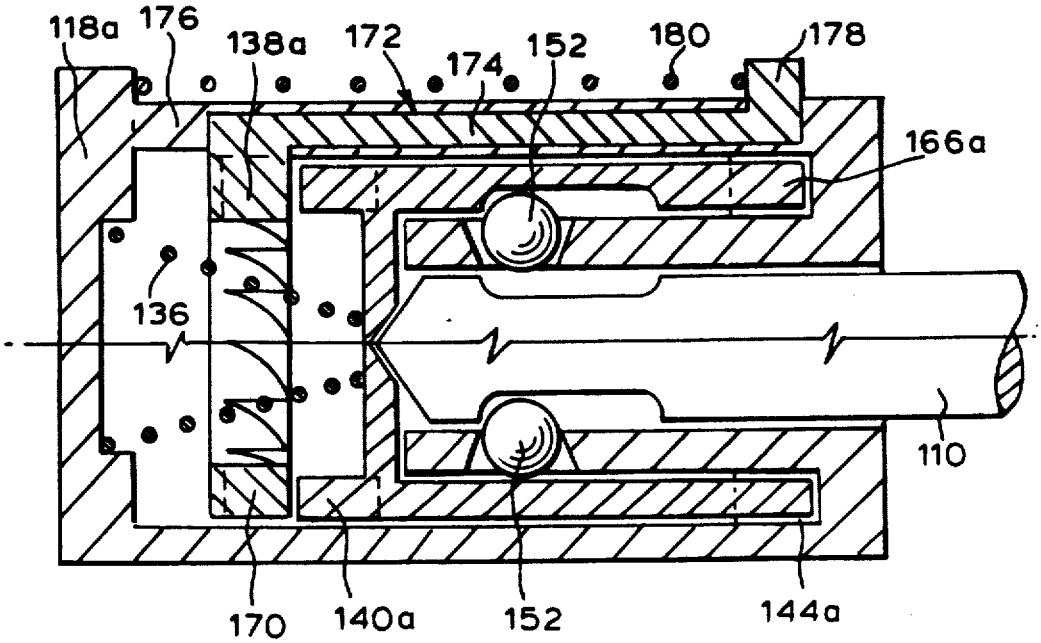
Figure 17:
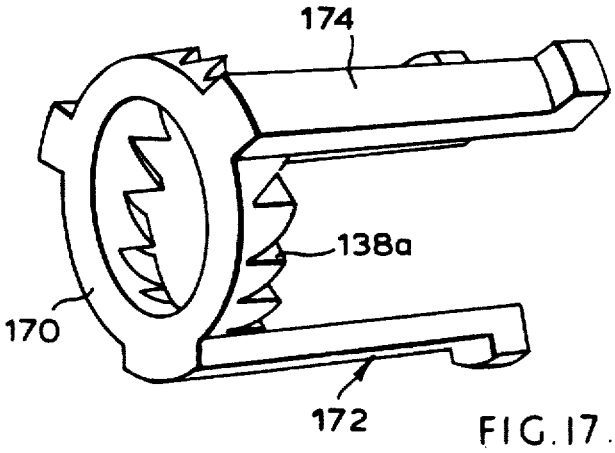
FIG. 17 is a perspective view of a detail of the device of FIG. 16.

The embodiment shown in FIGS. 16 and 17 is similar to that shown in FIG. 13 but instead of the sawtooth teeth 138 being fixed at the inner end of the housing 118, sawtooth teeth 138a are provided on a ring portion 170 of a spider 172 having (best seen in FIG. 17) legs 174 which are slidably mounted in longitudinally extending slots 176 in the wall of the housing 118a. The spider 172 is slidable axially to a limited degree in the housing 118a but is prevented by interaction between the legs 174 and the walls of the slots 176 from angular movement relative to the housing 118a. The free ends of the legs 174 of the spider have outwardly projecting feet 178 which are acted upon by a weak compression spring 180 to urge the spider 172 towards the open end of the housing 118a until the outwardly projecting feet 178 engage the ends of the longitudinally extending slots 176. With this arrangement, one or other of the sawtooth teeth 140a and 166a on the slider are always at least partially in engagement with the respective sawtooth teeth 138a, 144a to provide a detent operation and prevent unintentional angular displacement of the cup-shaped slider 126 during axial movement thereof.

Figure 18:
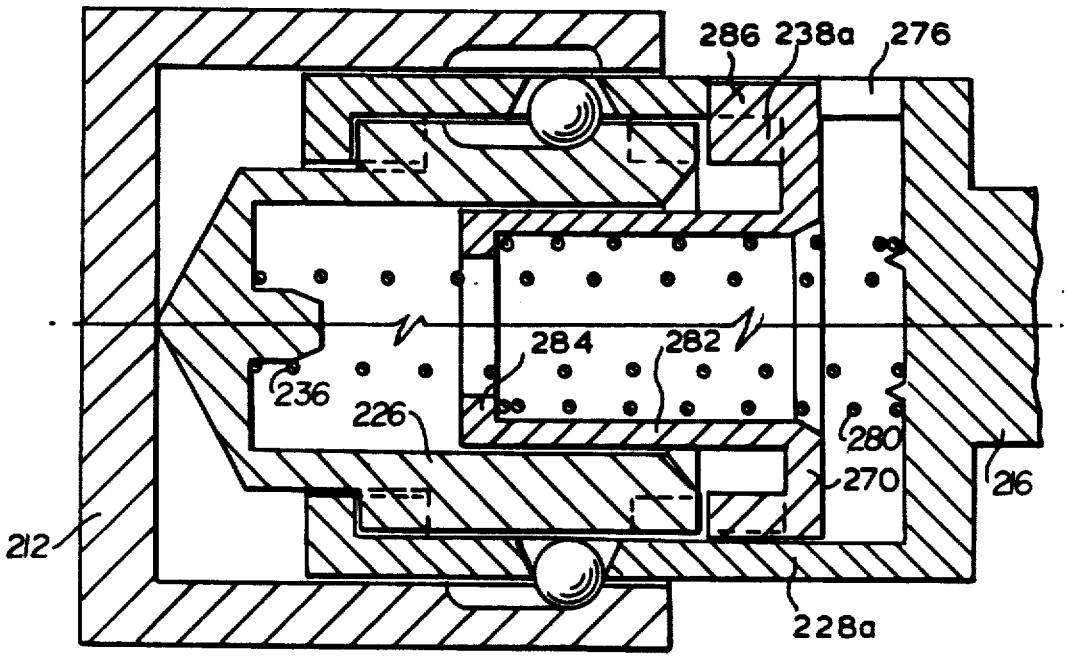
FIG. 18 is a longitudinal sectional view of yet another embodiment of a device according to the invention.
Figure 19:
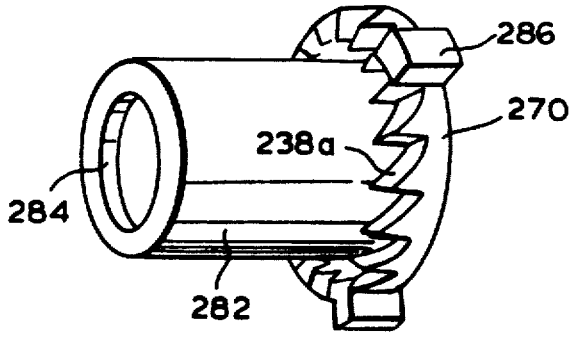
FIG. 19 is a perspective view of a detail of the device shown in FIG. 18.

The same principle may be applied to the embodiment of FIG. 15 as shown in FIGS. 18 and 19. In this case instead of the sawtooth teeth 238, teeth 238a are provided on a ring 270 at one end of a tube 282. The tube 282 extends into the slider 226 and has an inwardly directed flange 284 at its end remote from the ring 270 which is acted upon by a weak compression spring 280. The tabs 286 project radially outwards from the ring 270 and are guided in slots 276 to permit axial but prevent angular movement of the tube 280 relative to the housing 228a.

The embodiment described above are given by way of example only and many other modifications may be possible without departing from the scope of the invention as defined in the appended claims.

I claim:

1. A releasable axial locking device comprising two separable members adapted to be locked together and unlocked by relative axial movement of either of said two separable members in one direction, a slider juxtaposed one of said two separable members, said slider being movable axially relative to said one of said two separable members, resilient means interposed said slider and said one of said two separable members such that when the two members are moved axially relative to one another in said one direction said slider engages the other of said two separable members, and means for displacing said slider in an angular direction as it is moved axially against said resilient means so that the angular displacement of said slider which occurs when said two separable members are moved relative to each other in said one direction results in said two separable members being locked relative to one another and subsequent angular displacement of said slider which occurs when the two locked members are again moved relatively to one another in said one direction results in said members being unlocked and thereby axially separable in a direction opposite to said one direction.

2. The locking device of claim 1, wherein:

said slider is always displaced in only one angular direction;

said means for displacing said slider further comprises two sets of first mutually engageable teeth, one set of which is on said one member and the other set of which is on said slider, and further comprising two sets of second mutually engageable teeth, one set of which is one said one member and the other set of which is associated with said slider, said first mutually engageable teeth being for effecting angular displacement of said slider in said one angular direction as it moves axially against the force of said resilient means and said second set of mutually engageable teeth being for effecting angular displacement of said slider in said one angular direction as it moves axially under the urging force of said resilient means in order that when said slider is again moved axially against the force of said resilient means mutual engagement of said first set of mutually engageable teeth effects further angular displacement of said slider in said one angular direction.

3. The locking device of claim 2, wherein said slider is held captive in said one member with at least a part thereof being between said one set of first mutually engageable teeth and said one set of second mutually engageable teeth.

4. The locking device of claim 2, wherein said other set of second mutually engageable teeth is on said other member, and wherein said other member and said further have means to prevent relative angular movement between them when fully engaged with one another.

5. The locking device of claim 4, wherein said one member is a female member having said one set of first and said one set of second mutually engageable teeth in axially spaced and mutually facing relationship and said other member is a male member having said other set of second mutually engageable teeth extending radially outwardly therefrom and being insertable through a correspondingly shaped opening in one end of said female member.

6. The locking device of claim 1, wherein said first and second members are lockable together by a plurality of locking elements held captive in one member and movable radially by a circumferentially extending cam surface rotatably by or with said slider, to engage in a groove on said other member and then be disengageable from said groove, as said slider is displaced angularly.

7. The locking device of claim 6, wherein the locking elements are locking balls.

8. The locking device of claim 2, wherein either of said one set of first teeth and said one set of second teeth is mounted on a resiliently loaded axially movable member arranged so that at all times during operation of the device there is at least partial engagement between said first teeth and said second teeth.

*9. A releasable axial locking device comprising two separable members adapted to be locked together by a first axial movement of said two separable members relative to each other in a first direction and unlocked from each other by a second axial movement of said two separable members relative to each other in said first direction, a slider slidably connected to one member of said two separable members and movable in an axial direction relative to said one member in response to said first and said second axial movements of said two separable members relative to each other, means for angularly displacing said slider to a first position in response to said movement of said slider in said axial direction by said first axial movement of said two separable members in said first direction and for angularly displacing said slider to a second position in response to said movement of said slider in an axial direction by said second axial movement of said two separable members relative to each other in said first direction, and means for locking said two separable members to each other in response to said slider being angularly displaced to said first position, said means for locking further responsive to said slider being angularly displaced to said second position for unlocking said two separable members, said unlocking permitting said two separable members to be separated from each other.*

*10. The locking device of claim 9 wherein said means for locking comprises a locking member integral with said slider.*

*11. The locking device of claim 9 wherein said means for angularly displacing said slider further comprises:*

*a first set of saw teeth provided at one end of said one of said two separable members;*

*a mating set of saw teeth provided at the end of said slider adjacent to said one end of said one of said two separable members; and*

*a resilient member producing a force biasing said slider towards said one end of said one of said two separable members, the engagement of said mating set of saw teeth with said first set of said saw teeth angularly displacing said slider relative to said one of said two separable members.*

*12. A releasable axial locking device comprising two separable members adapted to be locked together and separated by an axial movement of said two separable members relative to each other, a slider slidably connected to one member of said two separable members and movable in an axial direction relative to said one member in response to said axial movement of said two separable members relative to each other, means for angularly displacing said slider in response to said axial movement of said slider, and means for locking said two separable members to each other in response to an initial angular displacement of said slider and for unlocking said two separable members permitting said two separable members to be separated from each other in response to a subsequent angular displacement of said slider, said means for angularly displacing said slider comprising:*

*a first set of saw teeth provided at one end of said one of said two separable members;*

*a mating set of saw teeth provided at the end of said slider adjacent to said one end of said one of said two separable members; and*

*a resilient member producing a force biasing said slider towards said one end of said one of said two separable members, the engagement of said mating set of saw teeth with said first set of said saw teeth angularly displacing said slider relative to said one of said two separable members.*

*13. The locking device of claim 12, wherein said means for locking comprises a locking member angularly displaced by said slider in an alternating sequence from a second position in which said two separable members are unlocked to a first position in which said locking member provides an engagement between said two separable members preventing substantial axial movement of said two separable members in a direction away from each other.*

*14. A releasable axial locking device comprising two separable members adapted to be locked together and separated from each other by repeated axial movements of said two separable members relative to each other, a slider slidably connected to one member of said two separable members and movable in an axial direction relative to said one member in response to a first axial movement of said two separable members relative to each other, means for angularly displacing said slider in a first angular direction in response to said first axial movement of said slider, and means for locking said two separable members to each other in response to a first angular displacement of said slider in said first angular direction, said means for locking further responsive to a second angular displacement of said slider in said first angular direction in response to a second axial movement of said slider for unlocking said two separable members, said second axial movement of said slider resulting from a second axial movement of said two separable members relative to each other, whereby said repeated axial movements of said two separable members relative to each other produces a progressive angular displacement in said first angular direction alternately locking and unlocking said two separable members.*

*15. The locking device of claim 14, wherein said means for locking comprises a locking member angularly displaced by said slider in an alternating sequence from a second position in which said two separable members are unlocked to a first position in which said locking member provides for an engagement between said two separable members which prevents substantial axial movement of said two separable members in a direction away from each other.*

* * * * *